United States Patent [19]

Richard et al.

[11] Patent Number: 4,894,108

[45] Date of Patent: Jan. 16, 1990

[54] METHOD OF FORMING A COMPOSITE LEAF SPRING WITH FABRIC WEAR PAD

[75] Inventors: David S. Richard, Dayton; John E. Mutzner, Covington; John F. Eilerman; Thomas E. Rau, both of Dayton, all of Ohio

[73] Assignee: General Motors Corporation, Detroit, Mich.

[21] Appl. No.: 258,757

[22] Filed: Oct. 17, 1988

[51] Int. Cl.[4] .............................................. B29C 43/02
[52] U.S. Cl. ..................................... 156/245; 264/258; 267/49; 267/148
[58] Field of Search .................... 156/245; 267/47, 49, 267/148, 149, 260, 262; 264/258; 428/257, 258, 259; 139/408, 413, 414, 415, 420 R, 420 A

[56] References Cited

U.S. PATENT DOCUMENTS

| | | | |
|---|---|---|---|
| 2,526,738 | 10/1950 | Finlayson et al. | 139/420 R |
| 2,694,568 | 11/1954 | Watson | 267/49 |
| 2,862,283 | 12/1958 | Rasero | 139/408 |
| 2,872,181 | 2/1959 | Runton | 267/49 |
| 2,890,041 | 6/1959 | Runton et al. | 267/49 |
| 3,530,212 | 9/1970 | Kienle et al. | 264/137 |
| 3,586,307 | 6/1971 | Brownyer | 264/47 |
| 3,698,702 | 10/1972 | Beck | 267/47 |
| 3,804,479 | 4/1974 | Butzow et al. | 139/420 R |
| 3,900,357 | 8/1975 | Huchette et al. | 156/185 |
| 3,968,958 | 7/1976 | Huchette et al. | 267/149 |
| 4,196,248 | 4/1980 | Dutt | 428/259 |
| 4,411,159 | 10/1983 | Spear et al. | 267/47 |
| 4,468,014 | 8/1984 | Strong | 267/47 |
| 4,530,490 | 7/1985 | Misumi et al. | 267/47 |
| 4,546,958 | 10/1985 | Ohno et al. | 267/47 |
| 4,556,204 | 12/1985 | Pflederer | 267/148 |
| 4,560,525 | 12/1985 | Ryan | 264/136 |
| 4,565,356 | 1/1986 | Nickel | 267/54 |
| 4,598,900 | 7/1986 | Yamamoto et al. | 267/52 |
| 4,611,793 | 9/1986 | Nishiyama et al. | 267/52 |
| 4,630,804 | 12/1986 | Fesko | 267/52 |
| 4,637,595 | 1/1987 | Mishima et al. | 267/52 |
| 4,659,071 | 4/1987 | Woltron | 267/149 |
| 4,684,110 | 8/1987 | Sale et al. | 267/148 |
| 4,688,778 | 8/1987 | Woltron | 267/148 |
| 4,707,317 | 11/1987 | Epel et al. | 264/136 |
| 4,730,815 | 3/1988 | von Estorff et al. | 267/52 |

FOREIGN PATENT DOCUMENTS

| | | | |
|---|---|---|---|
| 0549702 | 12/1957 | Canada | 267/49 |
| 0248929 | 11/1986 | Japan | 267/47 |
| 2123521 | 2/1984 | United Kingdom | 267/260 |

OTHER PUBLICATIONS

Modern Plastics Encyclopedia, Jarrel, Oct. 1977, p. 172.

Primary Examiner—Robert A. Dawson
Assistant Examiner—Steven D. Maki
Attorney, Agent, or Firm—Ronald L. Phillips

[57] ABSTRACT

A composite leaf spring for a motor vehicle has an elongated body of layers of epoxy coated fibers extending in the longitudinal direction of the spring. The composite fiber/adhesive body is formed and cured to provide sufficient strength and flexibility to suspend the vehicle. A synthetic fiber pad is fixed adjacent the end of the spring for engagement with the spring hanger of the suspension system to resist wear of the body at the interface with the hanger. In the preferred embodiment, the pad is a woven fabric of aramid fibers at least some of which extend substantially normal to the wear interface. A specific double plane weave fabric including a warp/fill fiber ratio of approximately 7:1 provides superior results. Epoxy resin is preferred for the adhesive both for the body of the spring and for pre-impregnation of the pad. In the related method, the pre-impregnated pad is applied to the mold contoured to correspond to the shape of the spring and elongated fibers are layered in the mold over the pad. Sufficient heat and pressure is applied to integrally bond the pad to the spring to form the wear surface.

2 Claims, 2 Drawing Sheets

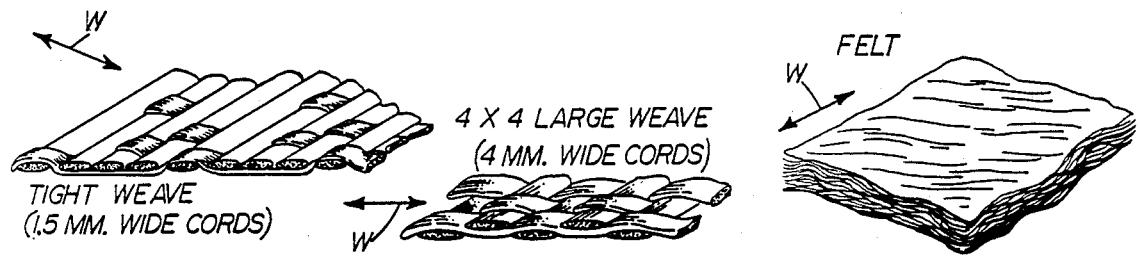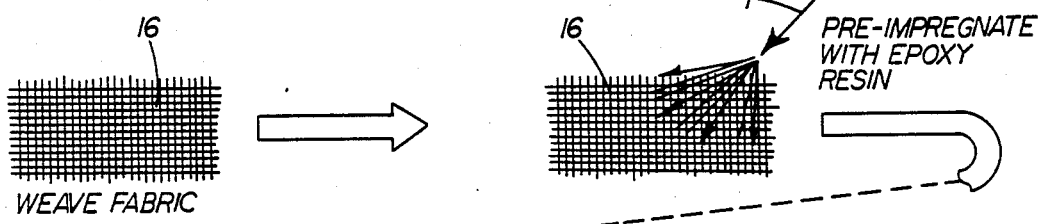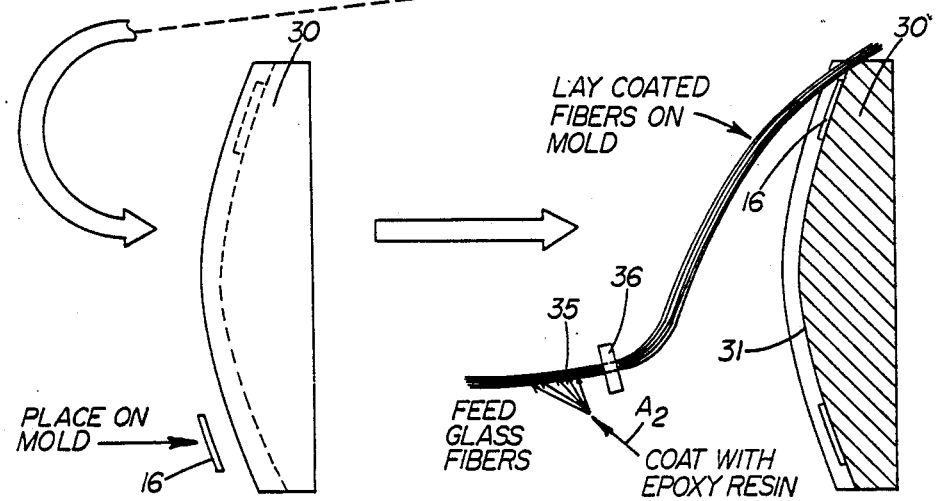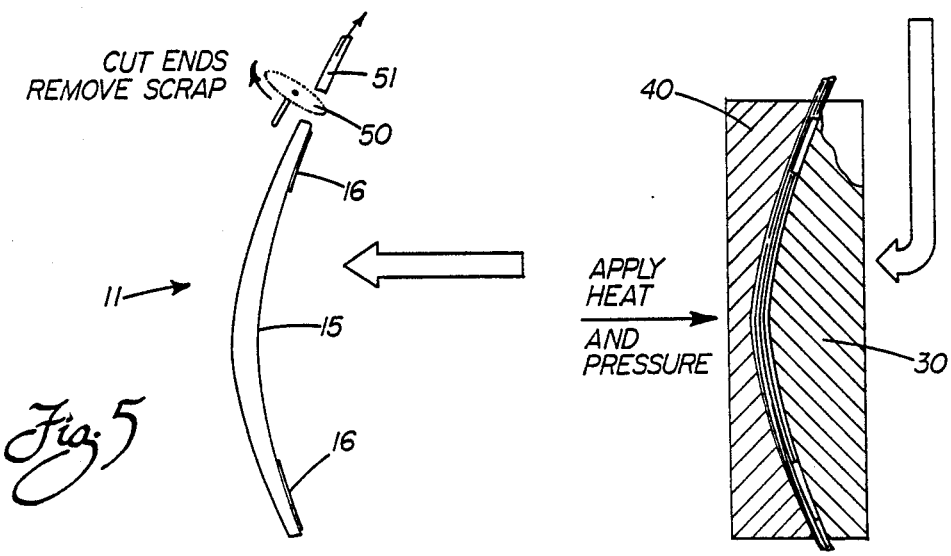
Fig. 5

METHOD OF FORMING A COMPOSITE LEAF SPRING WITH FABRIC WEAR PAD

BACKGROUND OF THE INVENTION

The present invention relates to leaf springs for a motor vehicle, and more particularly, to a composite leaf spring having an improved wear pad on the end of the spring for engagement with the suspension hanger, and the related fabrication method.

BACKGROUND OF THE INVENTION

Composite leaf springs have held promise for the past couple of decades as a replacement for steel leaf springs. The automotive industry has shown the most interest in a monoleaf spring fabricated of a composite glass fiber/epoxy resin. The body of the spring is formed and cured to provide sufficient strength and flexibility to suspend the vehicle. Recent progress in mass production techniques and handling of the materials involved in the manufacture have led to a proven production-worthy vehicle component.

One of the most significant advantages of the composite spring is the reduction in weight. For example, in one monoleaf transverse design for an automotive application, a savings of 15 kilograms has been realized. In most applications, at least a 60% weight reduction is realized. In addition, laboratory fatigue tests have proven that the composite springs are up to five times more durable than conventional multileaf steel springs. Down time due to spring problems is virtually eliminated with the composite spring.

Automotive engineers have developed several types of brackets to adapt the monoleaf composite spring to existing types of hanger brackets in standard suspension systems. Full compatability is very desirable to minimize changeover costs for new vehicle production, as well as to satisfy the retrofit market. While some of the development work involved in providing the attachment function has proceeded relatively smoothly, particular difficulty and repeated failure has plagued the engineers when it comes to the typical mounting for truck tractors and trailers.

A spring having a life of several million fatigue cycles representing several hundred thousand road miles is expected. Prior to the present invention, the most successful attempt to provide an adaptation for a tractor/trailer has been to provide the ends of the composite spring with a steel, U-shaped slipper. The upper leg of the slipper engages the weight bearing cam of the typical hanger assembly for this type of vehicle. As the axle moves relative to the frame of the vehicle, the composite spring moves up and down causing the ends of the spring to slide and rub against the cam surface. As with all steel springs, the problem of corrosion at the wear interface causes increased friction and an inevitable deterioration of the ride of the vehicle. Furthermore, and of more importance, the steel slipper is prone to the development of fatigue cracks within a relatively short span of time resulting in costly truck down time. Despite numerous attempts at modification of the steel slipper, including establishing different heat treatment parameters and attachment configurations, the end result has been highly disappointing.

As a result, a new leaf spring for use with over-the-road tractors/trailers or the like is clearly desirable. A departure from use of hardened steel slippers and the discovery of a more durable, preferably lower cost alternative should be the result.

SUMMARY OF THE INVENTION

Accordingly, it is a primary object of the present invention to provide a composite leaf spring and related fabrication method overcoming the shortcomings and failures of the prior attempts described above.

It is another object of the present invention to provide a composite leaf spring and related suspension system having a fiber/adhesive body with an integral wear pad, particularly adapting the spring for extremely long life.

It is still another object of the present invention to provide a composite leaf spring for a tractor/trailer application eliminating steel components on the spring body and, thus, eliminating corrosion and metal fatigue, while at the same time further reducing the weight.

It is another and related object of the present invention to provide a composite spring attaining up to a 60% weight reduction to allow the vehicle to carry more payload over longer distance.

It is still another object of the present invention to provide a highly economical composite leaf spring to fabricate, with the wear resistant pad being molded into the spring during fabrication.

Still another object of the present invention is to provide a composite fiber/adhesive spring having a synthetic fiber pad having exceptional low friction characteristics for improving the ride characteristics of the vehicle for the life of the spring.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved composite leaf spring has been provided particularly adapted for use in a tractor/trailer type motor vehicle. The spring includes an elongated body of adhesive coated fibers extending in the longitudinal direction of the spring. The body is formed and cured to provide sufficient strength and flexibility to suspend the vehicle on a hanger forming a part of the suspension system of the vehicle. In particular, a synthetic fiber pad is fixed adjacent the end of the spring for engagement with the cam surface of the spring hanger. The pad resists wear of the body at the wear interface with the hanger, and gains longevity results not heretofore deemed possible.

The pad is preferably a woven fabric of aramid fibers. The weave pattern of the pad is selected to assure that the fibers extend at an angle to the wear interface and during the initial wearing-in period the angle of the fibers continues to increase toward an orientation of normal to the wear interface. To do this, a fabric is preferably selected having a double plane weave with the warp direction of the fabric extending in the direction of the relative sliding movement between the pad and the cam surface of the hanger. While the mechanics of this interaction may not be fully understood, it is suggested that the high strength aramid fibers are caused to bristle or broom up as the pad continues to slide and rub against the cam surface of the hanger. This provides the desired high wear resistance by causing the fibers to extend at the desired angle to the cam surface. As has been proven, the wear tips that are formed not only substantially increase the wear resistance and provide the superior results in life expectancy of the spring, but also assure relatively low friction and low noise sliding action to improve the overall spring flexibility and ride characteristics of the vehicle.

The most dramatic increase in wear resistance is provided when some of the fibers are lifted to extend substantially normal to the wear interface. Tufted strands extending vertically up through the weave pattern may be inserted to take further advantage of this phenomena. A particular areal density of 51 oz./sq. yd. and a warp-/fill fiber ratio in the pad of approximately 7:1 is also proven to be highly desirable.

The synthetic fiber pad is particularly adapted for being formed integral with the spring body. The pad when combined with glass fiber/epoxy resin body shows exceptional results.

To provide lateral wear surfaces to engage the sides of the hanger, the edges of the pad are extended around the sides of the spring. These side extensions are integral with the pad. Thus, the entire end of the spring is protected and full extended life is assured.

The related suspension system of the present invention is particularly adapted to include a composite leaf spring having an integral synthetic fiber wear pad, as described above. The frame and axle of the vehicle are thus connected in a unique manner by the spring and integral pad. A cam-type hanger assembly on the vehicle frame engages the free end of the spring along the pad, which is preferably a woven fabric of aramid fibers. The suspension system of the present invention has proven to be, not only lightweight in design, but also economical to build and maintain. At the same time the suspension system inherently provides a superior ride for the vehicle.

In another aspect of the present invention, the composite leaf spring of the present invention is fabricated by a unique combination of process steps. An elongated mold is provided which is contoured to correspond to the shape of the spring. The wear pad formed of synthetic fibers is applied in the location in the mold adjacent the end. The pad is pre-impregnated with epoxy resin with sufficient tackiness to initially hold the pad in position in the mold. Once the pad is in position, elongated epoxy coated glass fibers are layered in the mold over the pad. Heat and pressure is applied to form and cure the spring. The process is carried out so that the heat and pressure is sufficient so that the epoxy resins in the body of the spring and in the pad cross migrate to integrally bond the pad in position. The wear resistant, low friction pad on the composite spring body resulting from this process or method thus exhibits the superior attributes desired.

Still other objects of the present invention will become readily apparent to those skilled in this art from the following description wherein there is shown and described the preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and description will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention. In the drawings:

FIGS. 4A, 4B and 4C are illustrations of alternative pads of woven or randomly placed fibers that may be utilized in accordance with the broader aspects of the present invention; and FIG. 5 is a diagrammatic showing of the process steps for forming the composite leaf spring of the present invention.

Reference will now be made in detail to the present preferred embodiment of the invention, an example of which is illustrated in the accompanying drawing.

DETAILED DESCRIPTION OF THE INVENTION

Figure 1:
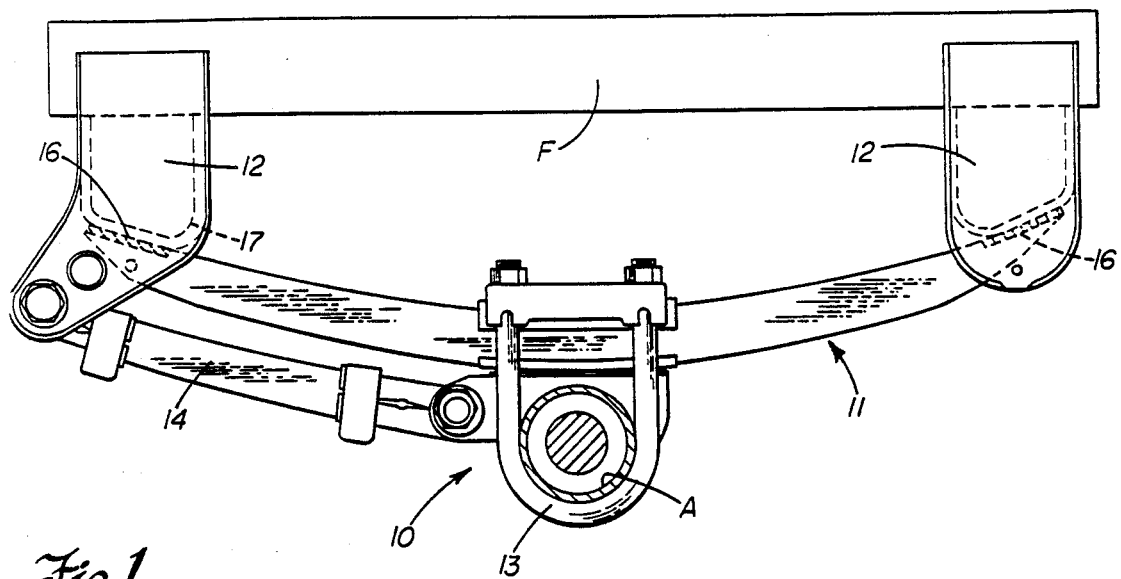
FIG. 1 is a side view of a suspension system including a composite leaf spring with wear pads at the ends.

Reference is now made in particular to FIG. 1, showing an improved suspension system 10 including a composite leaf spring 11. The suspension system 10 flexibly couples an axle A to a vehicle frame F. A hanger assembly 12 is positioned at each end of the spring 11 attached to the frame F. A U-bolt assembly 13 is at the mid-point of the spring 11 between the two brackets 12 to secure the axle A. A pivotal torque or control arm 14 is attached to the leading or front hanger assembly 12 in a manner well known in the art.

As will become more apparent below, the leaf spring includes an elongated body 15 of adhesive coated fibers extending in the longitudinal direction of the spring. Once the composite fiber/adhesive body is formed and cured, there is sufficient strength and flexibility to suspend the vehicle.

A synthetic fiber pad 16 is fixed adjacent each end of the spring 11 for wear engagement with cam 17 of the spring hanger assembly 12. As can be visualized by reviewing FIG. 1, the upper surface of the pad 16 of the spring 11 slidably engages the mating, operative surface of the cam 17. As the frame F of the vehicle moves up and down in response to driving action on the highway, the wear pad 16 slides and rubs against the cam 17 along a wear interface.

The body 15 of the spring 11 is preferably formed of a glass fiber/epoxy resin combination molded under heat and pressure. The shape of the spring 11 is shown for a typical application to an over-the-road trailer; however, it is to be understood that all other similar applications are possible in accordance with the broadest aspect of the present invention. To provide other flexure characteristics so as to tune the spring to a particular application, the cross section of the body 15 is simply varied during the fabrication process, as will be explained in detail below. This tuning provides for flexure points at different locations along the longitudinal axis of the body 15, but this does not change the basic function of the wear pad 16.

Figure 3:
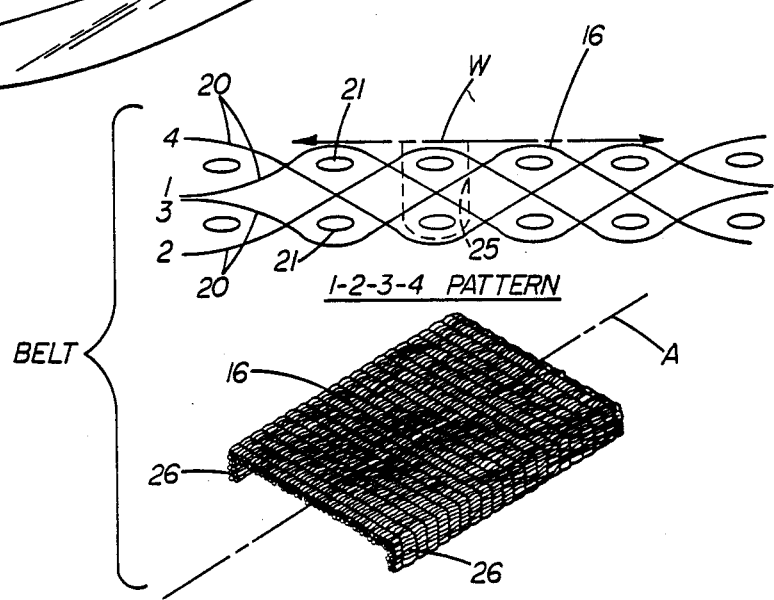
FIG. 3 is a two-part illustration showing the details of the preferred woven pad.

In accordance with the preferred embodiment of the invention, the pad 16 comprises a woven fabric of aramid fibers, as best shown in FIG. 3. The weave pattern of the preferred pad includes individual aramid fibers depicted in a 1-2-3-4 sequence in FIG. 3. This thus depicts warp fibers 20 that are extending along the direction of the longitudinal axis of the pad 16 and the spring, as depicted by the dashed line axis A in FIG. 3. Extending across the warp fibers 20 are two layers of fill fibers 21 (see also FIG. 3).

Since there are two fill fibers 21 extending laterally across the pad 16, the fabric can be described as being a double plane weave. The fill fibers 21 serve to maintain the curved, generally sinusoidal configuration of the warp fibers 20.

The wear interface between the pad 16 and the operative surface of the cam 17 is depicted by the double arrow W in FIG. 3. Thus, the warp fibers 20 extend at an angle to the wear interface W. This means that the operative face of the cam 17 is rubbing and wearing against the apex of each of the fibers 20 along the upper wear surface of the pad 16.

The warp fibers 20 all extend at an angle to the wear interface W and during the initial wearing in period, the fibers are eventually broken at the apexes above the upper fill fibers 21. When this occurs, wear tips of the fibers are exposed and this provides an even further increase in the wear resistance of the pad 16. During the initial wearing in period, the angle of the fibers continues to increase toward an orientation of normal to the wear interface W. While the mechanics of this interaction and increasing wear resistance is not fully understood, it is suggested that the high strength aramid fibers are caused to bristle or broom up, thus increasingly extending the fibers at the desired angle to the wear interface. As the wearing continues, the fibers tend to approach normal to the wear interface W and this provides even additional wear resistance and greater life expectancy of the spring. Another part of this phenomena is that the interaction provides a relatively low friction surface so that the sliding action is improved and the overall spring flexiblity and ride characteristics of the vehicle are enhanced. A related advantage is the relatively low noise characteristic provided by the composite material of the pad 16 rubbing against the steel cam 17 as opposed to the steel/steel interfaces of the prior art.

The closer the warp fibers 20 approach being normal or perpendicular to the wear interface W, the better the wear resistance becomes. This unexpected result goes counter to conventional thinking since in a steel spring the wear rate generally increases after the initial hardened surface barrier is worn through. To increase this favorable result even further, it is contemplated that tufted strands 25, shown by the dashed line outline in FIG. 3, may be added. These strands are inserted to provide vertical strands up through the weave pattern, thus greatly increasing the wear tips that are normal to the wear interface W.

In the particular weave pattern shown in FIG. 3, it has also been discovered that the preferred areal density of approximately 51 oz./sq. yd. increases the effectiveness. Also, generally as shown, a warp/fill fiber ratio in the pad 16 of approximately 7:1 is also proven to be highly desirable. More particularly, the fabric of the preferred embodiment comprises a range of 70-90 picks/inch in the warp direction and 10-14 picks/inch in the fill direction.

The aramid fiber pad 16 is particularly adapted for being integrally molded into the spring body 15. As will be described below, it is desirable for the intricacies within the weave pattern to be impregnated with epoxy resin prior to the molding procedure. The epoxy resin is selected to be compatible with the epoxy resin used in the body 15 of the spring 11. When this is done, the epoxy resins cross migrate causing the pad to be integrally combined with exceptional holding power.

Figure 2:
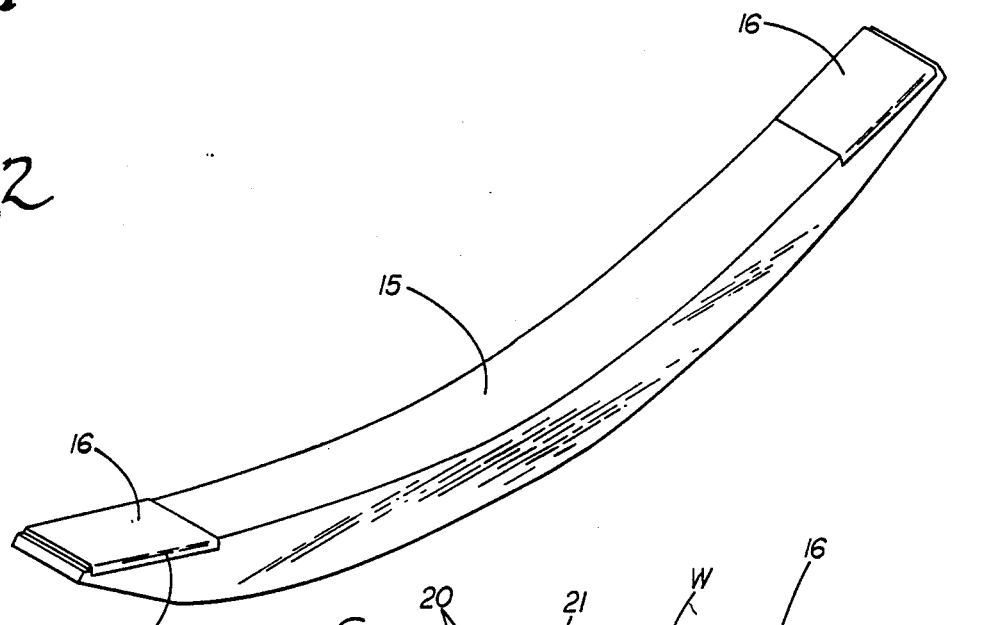
FIG. 2 is a perspective view of the composite leaf spring of the present invention and showing in greater detail the integral wear pads.

In order to provide lateral wear surfaces to engage the sides of the hanger assembly 12, the pad 16 includes integral side extension 26 (see FIGS. 2 and 3). Thus, this provides for the entire end of the spring 11 to be protected and the full extended life is assured.

The particular aramid fiber of the preferred embodiment of the invention is known by the trademark KEVLAR 29 and marketed by E.I. Du Pont de Nemours Company of Wilmington, Delaware. While this particular synthetic fiber has proven highly effective, it should be apparent that other fibers such as graphite, boron, nylon, stainless steel, glass or combinations of these fibers can be used. Furthermore, other weave patterns may be used in accordance with the broadest aspect of the present invention, such as the tight weave pattern of 1.5 mm cords shown in FIG. 4, the 4×4 large weave pattern of 4 mm wide cords shown in FIG. 4B or the random fiber felt-type pad of FIG. 4C. As shown in each of these figures, the preferred direction of the wear interface W is shown by the double arrow.

In another aspect of the present invention and as illustrated in FIG. 5 of the drawings, the composite leaf spring 11 with the integrally molded wear pads 16 is fabricated by a unique combination of process steps. As illustrated, the fabric is first woven into the desired weave pattern, preferably as shown in FIG. 3. The woven fabric is then pre-impregnated with epoxy resin, as depicted by the arrow array $A_1$. It is understood that the pad 16 is precut to the desired dimensions and after being impregnated can be maintained in a tacky or uncured state by refrigeration or other methods.

An elongated mold 30 is provided to manufacture the composite spring 11 including a mold cavity 31 contoured to correspond to the finished shape of the spring 11. The wear pad 16 that has been pre-impregnated is taken in its tacky state and applied to each end of the mold 30 so as to be at the ends of the finished spring 11. The tackiness of the epoxy resin is sufficient to initially hold the pad in position.

Once the pad 16 is in position, multiple glass fiber rovings or cords made up of a plurality of fibers and coated with epoxy resin (see coating arrow array $A_2$) are attached to one end of the mold 30 to start the forming process. While only one cord 35 is depicted in FIG. 5, it is to be understood that multiple cords can be provided and each can be guided and directed through a movable guide and resin stripper 36. With this arrangement, the cord 35 and others (not shown) are layered onto the mold 30 by relative movement between the cord and the mold. The layering of the glass fibers engage the backs of the pads 16 holding the pads in position and eventually covering them. The glass fibers are continued to be layered in the mold until the completed cross section of the spring body 15 has been completed. As indicated, the cavity in the mold can be contoured to fit the specific spring characteristics desired in the finished product so that any spring can be actually tuned to a particular vehicle during the fabrication process.

Once the desired amount of glass fibers have been layered in position on the mold 30, a companion mold 40 is brought into position and heat and pressure is applied to provide the final form and cure the spring 11. The heat and pressure is also provided so as to be sufficient to assure that the epoxy resins in the body 15 and in the pad 16 cross migrate to integrally bond the pad 16 in position. Finally, the completed composite spring 11 including a flexible body 15 and wear resistant, low friction pads 16 on each end is removed from the mold assembly 30, 40. A suitable cutter 50 is used to trim the scrap 51, and then after minor finishing operations the spring 11 is ready for use in a suspension.

In summary, numerous benefits have been described and illustrated which result from employing the concepts of the invention. Of particular importance is the concept of utilizing a synthetic fiber pad 16 fixed adjacent the end of the composite leaf spring 11 to form a wear surface for engagement with the hanger assembly 12 of the suspension system 10. Exceptional wear resistance and thus long life expectancy is provided to any spring of this type, such as the spring 11 shown as the preferred embodiment, a type of spring particularly adapted for use with tractor/trailer applications. As a further example of an advantage connected with the invention, corrosion and metal fatigue are eliminated as a potential source of problems and up to a 60% weight reduction is attained to make the concept of the invention even more attractive. The pad 16 is pre-impregnated with epoxy resin and is molded integrally with the composite leaf spring 11. By using a woven fabric in a double plane weave and comprising aramid fibers 20, 21, (see FIG. 3), the spring is assured of maximum longevity. In accordance with the related process of the invention, the pre-impregnated pad 16 is placed in a tacky condition on the mold 30 and the coated glass fibers are layered onto the mold over the pad to provide a highly efficient approach to fabricating the spring 11.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of forming a composite leaf spring for a vehicle suspension system in a mold with a contour corresponding to the spring comprising:
    coating elongated fibers with adhesive;
    selecting a fabric pad of synthetic fibers woven in a double plane weave with about 70–90 picks/inch in the warp direction and about 10–14 picks/inch in the fill direction;
    applying the pad in a location in the mold to form an end of the spring with the pad arranged so that the warp direction extends longitudinally of the spring;
    laying the coated fibers in layers in the mold over the pad; and
    applying heat and pressure to the coated fiber layers to form and cure the spring and to integrally bond the pad to the spring;
    whereby the spring is formed with a wear surface at the end.

2. The forming method for a composite leaf spring of claim 1, wherein there is provided the additional steps of:
    utilizing aramid fibers for the pad;
    utilizing epoxy resin for coating the elongated fibers to form the spring;
    pre-impregnating the pad with an epoxy resin prior to applying the pad to the mold; and
    maintaining sufficient tackiness of the pad to hold in position prior to laying of the coated fibers and bonding to the pad to form the spring.

* * * * *